(12) United States Patent
Leon et al.

(10) Patent No.: US 11,213,947 B2
(45) Date of Patent: Jan. 4, 2022

(54) APPARATUS AND METHODS FOR OBJECT MANIPULATION VIA ACTION SEQUENCE OPTIMIZATION

(71) Applicant: Intel Corporation, Santa Clara, CA (US)

(72) Inventors: Javier Felip Leon, Hillsboro, OR (US); David Israel Gonzalez Aguirre, Hillsboro, OR (US); Javier Sebastián Turek, Beaverton, OR (US); Ignacio Javier Alvarez, Portland, OR (US); Luis Carlos Maria Remis, Hillsboro, OR (US); Justin Gottschlich, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 219 days.

(21) Appl. No.: 16/455,263

(22) Filed: Jun. 27, 2019

(65) Prior Publication Data
US 2019/0321974 A1    Oct. 24, 2019

(51) Int. Cl.
    *B25J 9/16*    (2006.01)
(52) U.S. Cl.
    CPC ............ *B25J 9/163* (2013.01); *B25J 9/1612* (2013.01); *B25J 9/1661* (2013.01); *B25J 9/1687* (2013.01); *B25J 9/1664* (2013.01)
(58) Field of Classification Search
    None
    See application file for complete search history.

(56) References Cited

U.S. PATENT DOCUMENTS

| | | | | |
|---|---|---|---|---|
| 9,687,982 | B1* | 6/2017 | Jules | B25J 9/161 |
| 10,611,026 | B1* | 4/2020 | Sun | B25J 9/1664 |
| 10,792,810 | B1* | 10/2020 | Beckman | B25J 9/163 |
| 10,793,047 | B1* | 10/2020 | Theobald | B60P 1/54 |
| 2018/0218272 | A1* | 8/2018 | Manikonda | G06F 30/20 |
| 2019/0261566 | A1* | 8/2019 | Robertson | A01D 46/243 |

OTHER PUBLICATIONS

Flanagan, J. R., Bowman, M. C., and Johansson, R. S., "Control strategies in object manipulation tasks," Current Opinion in Neurobiology, 16(6):650-659. Motor systems /Neurobiology of behavior, 2006, 10 pages.

(Continued)

*Primary Examiner* — Abby Y Lin
*Assistant Examiner* — Dylan M Katz
(74) *Attorney, Agent, or Firm* — Hanley, Flight & Zimmerman, LLC

(57) ABSTRACT

Methods, apparatus, systems and articles of manufacture are disclosed for object manipulation via action sequence optimization. An example method disclosed herein includes determining an initial state of a scene, generating a first action phase sequence to transform the initial state of the scene to a solution state of the scene by selecting a plurality of action phases based on action phase probabilities, determining whether a first simulated outcome of executing the first action phase sequence satisfies an acceptability criterion and, when the first simulated outcome does not satisfy the acceptability criterion, calculating a first cost function output based on a difference between the first simulated outcome and the solution state of the scene, the first cost function output utilized to generate updated action phase probabilities.

26 Claims, 8 Drawing Sheets

(56) References Cited

OTHER PUBLICATIONS

Zeng, Z., Zhou, Z., Sui, Z., & Jenkins, O. C., "Semantic Robot Programming for Goal-Directed Manipulation in Cluttered Scenes," In 2018 IEEE International Conference on Robotics and Automation (ICRA) 2018, 8 pages.
Billard, A., Calinon, S., Dillmann, R., & Schaal, S., "Robot Programing by Demonstration," Springer Handbook of Robotics, 2008, 25 pages.
Yang, Y., Aloimonos, Y., Fermuller, C., & Aksoy, E. E., "Learning the Semantics of Manipulation Action, Proceedings of the 53rd Annual Meeting of the Association for Computational Linguistics and the 7th International Joint Conference on Natural Language Processing," Jul. 26-31, 2015, pp. 676-686, Beijing, China.
N. Hansen, S. D.Mueller, and P. Koumoutsakos, "Reducing the time complexity of the derandomized evolution strategy with covariance matrix adaptation (CMA-ES) Evolutionary Computation," 2003, 1 page. (Abstract only provided).
Schulman, J., Wolski, F., Dhariwal, P., Radford, A., & Klimov, O., "Proximal Policy Optimization Algorithms," 2017, 12 pages. http://doi.org/10.1016/j.jdeveco.2016.04.001.
Levine, S., Finn, C., Darrell, T., & Abbeel, P., "End-to-end training of deep visuomotor policies. The Journal of Machine Learning Research," 2016, 40 pages, 17(1).
Felip, J., Gonzalez-Aguirre, D., & Tickoo, O., "Towards intuitive rigid-body physics through parameter search. In IEEE-RAS International Conference on Humanoid Robots," 2017, 1 page. (Abstract only provided).
Bohg, J., Johnson-Roberson, M., León, B., Felip, J., Gratal, X., Bergström, N., Morales, A., "Mind the gap—Robotic grasping under incomplete observation. In Proceedings—IEEE International Conference on Robotics and Automation," 2011, 8 pages.
Felip, J., Laaksonen, J., Morales, A., & Kyrki, V., "Manipulation primitives: A paradigm for abstraction and execution of grasping and manipulation tasks. Robotics and Autonomous Systems," 2013, 1 page. (Abstract only provided).
Kingma, D. P., & Ba, J., "Adam: A method for stochastic optimization," 2014, 15 pages.
Gottschlich et al., "The Three Pillars of Machine Programming", ArXiv, May 8, 2018, retrieved from https://arxiv.org/pdf/1803.07244.pdf, 11 pages.

\* cited by examiner

FIG. 6A

| | MOVE (P1, P2, P3) | GRASP (P4, P5, P6) | RELEASE (P7, P8, P9) |
|---|---|---|---|
| MOVE (P10, P11, P12) | .23 | .81 | .66 |
| GRASP (P13, P14, P15) | .61 | .06 | .33 |
| RELEASE (P16, P17, P18) | .16 | .13 | .01 |

ACTION PHASE 1 (602a MOVE, 602b GRASP, 602c RELEASE)
ACTION PHASE 2 (604a MOVE, 604b GRASP, 604c RELEASE)

FIG. 6B

| | MOVE (P10, P11, P12) | GRASP (P13, P14, P15) | RELEASE (P16, P17, P18) |
|---|---|---|---|
| MOVE (P19, P20, P21) | .41 | .77 | .85 |
| GRASP (P22, P23, P24) | .30 | .01 | .14 |
| RELEASE (P25, P26, P27) | .29 | .12 | .01 |

ACTION PHASE 2 (604a MOVE, 604b GRASP, 604c RELEASE)
ACTION PHASE 3 (608a MOVE, 608b GRASP, 608c RELEASE)

APPARATUS AND METHODS FOR OBJECT MANIPULATION VIA ACTION SEQUENCE OPTIMIZATION

FIELD OF THE DISCLOSURE

This disclosure relates generally to robotics, and, more particularly, to methods and apparatus for object manipulation via action sequence optimization.

BACKGROUND

Robot object manipulation tasks involve a robot moving one or more objects from an initial configuration to a final configuration. To accomplish this transition, a robot can utilize one or more action phases (e.g., grasp, move, contact, release, etc.). Action phases are bound by contact events that are sub-goals of the overall object manipulation task.

BRIEF DESCRIPTION OF THE DRAWINGS

FIG. 6A is a first example probability table including probabilities that can be utilized to select a second action phase following a first action phase of an action phase sequence.

FIG. 6B is an example second probability table including probabilities that can be utilized to select a third action phase of the action phase sequence of FIG. 6A following the second action phase.

The figures are not to scale. In general, the same reference numbers will be used throughout the drawing(s) and accompanying written description to refer to the same or like parts.

Figure 1:
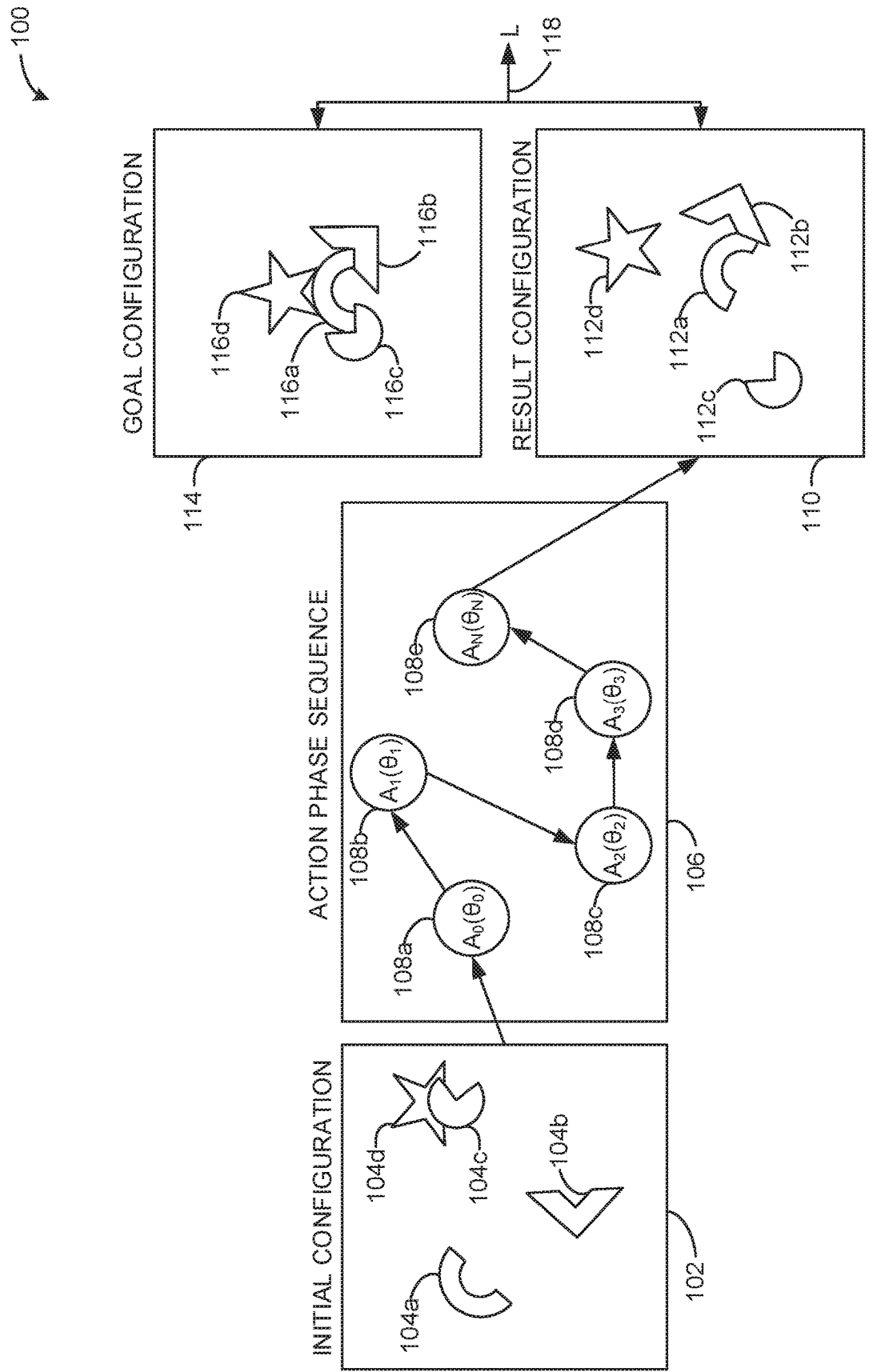
FIG. 1 is a schematic of an example object manipulation task executed in accordance with techniques disclosed herein.

Descriptors "first," "second," "third," etc. are used herein when identifying multiple elements or components, which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Robotic object manipulation tasks utilize a robot to transition an initial configuration of one or more objects to a goal configuration for the one or more objects. One conventional technique for object manipulation is to utilize programming by demonstration (PbD). In PbD, also referred to as imitation learning or goal-directed programming, a robot learns to complete a task based on examples or other input data. In kinesthetic PbD, a robot is manipulated to move through a task and observe and learn from the movements to execute the task. For example, in some kinesthetic PbD implementations, a user may manually move a robot to execute a task (e.g., rotate an arm of the robot, open an end-effector to receive an object, close an end-effector to grasp the object, move to a target location, release the object etc.), and the robot may learn from these movements to execute the task independently after the demonstration. In some PbD techniques, video examples are utilized to train a robot to complete a task.

However, conventional PbD implementations are cumbersome, requiring manual teaching techniques or generation of video examples that consume substantial time and are not easily generalized to solving other problems. For example, if a video example is utilized to train a robot to complete an object manipulation task using PbD, the robot may learn only one way motion pattern to solve the object manipulation task. In such an example, the one motion pattern represented in the video may not be the most efficient, and/or may not be generalizable to solving other object manipulation problems.

While some robot object manipulation implementations utilize simulations to train a robot, these techniques often fail to translate accurately in the real world (sometimes referred to as the "reality gap"). For example, techniques such as reinforcement learning suffer from domain adaptation when operating in the real world. Domain adaptation problems occur when simulators generate models which have large deviations from the real world captured by a robot's sensors. Thus, when a robot executes a task in the real-world, the result is significantly different than the simulated result.

Further, conventional robot object manipulation implementations often operate in high-dimensional spaces, which result in substantial training times. For example, a typical mobile manipulator may have fourteen degrees of freedom (e.g., three for the platform, seven for the robotic arm, four for the gripper), necessitating significant processing time to train to the robot to execute a task. Such highly dimensional robots may additionally have large working spaces that are difficult to explore and analyze.

Conventional object manipulation implementations are highly embodiment dependent, and thus often need to be frequently retrained to account for deviations in a task to be performed. Embodiments refer to different tasks that the robot is to perform. Additionally, conventional object manipulation implementations generate motion patterns that correspond to human motion. Such motion patterns are therefore constrained to the limits of the human body, which often differ from the constraints of the robot.

Example methods, apparatus, systems, and articles of manufacture disclosed herein generate action phase sequences by specifying a goal (e.g., a final configuration) based on one or more criteria (e.g., execution speed, energy efficiency, cost, etc.). As used herein, action phases (also referred to as primitives or action primitives) correspond to specific actions that a robot can perform. Example techniques disclosed herein include utilizing differentiable discrete action spaces and joint optimization of action sequences and action parameters to enable a robot to efficiently transform an initial configuration of objects to a goal configuration (e.g., a solution state) for the objects. Example techniques utilized herein implement sensor feedback to adjust action phase sequences in real-time, reducing the reality gap between simulations of the action phase sequences and actual real world outcomes when performing the action phase sequences.

Example methods, apparatus, systems, and articles of manufacture disclosed herein learn to perform object manipulation tasks within the constraints of a robot, therefore enabling an optimized action phase sequence that is tuned to meet specific constraints of the robot, as opposed to constraints of a human teacher. Example techniques disclosed herein utilize gradient-based methods (e.g., Stochastic Gradient Descent) to optimize action phases (e.g., which action phases are selected sequentially throughout the action phase sequence, which parameters are utilized for action phases, etc.) in an action phase sequence. In some example techniques disclosed herein, gradients are calculated for parameters (e.g., speed, torque, acceleration, etc.) of action phases based on a cost function. For example, methods, apparatus, systems, and articles of manufacture disclosed herein can continually adjust action phase parameters to move in a direction (e.g., in the parameter space) that reduces the value of the cost function.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using Stochastic Gradient Descent. However, any other training algorithm may additionally or alternatively be used. In examples disclosed herein, training is performed until one or more acceptability criteria are satisfied. For example, the acceptability criteria may include a percent difference between one or more object locations and the goal locations. In examples disclosed herein, training is performed at a robot.

Training is performed using training data. In examples disclosed herein, the training data originates from example initial configurations and goal configurations (e.g., images of initial and goal configurations) for an object manipulation task. Because supervised training is used, the training data is labeled. Labeling is applied to the training data by an operator configuring a robot to perform an object manipulation task.

Once training is complete, the model is deployed for use as an executable construct that processes an input and provides an output based on the network of nodes and connections defined in the model. The model is stored at the robot or at a location accessible via the robot (e.g., a network location). The model may then be executed by the action phase generator to generate action phase sequences.

Once trained, the deployed model may be operated in an inference phase, distinct from the learning phase, to process data. In the inference phase, data to be analyzed (e.g., live data from sensors) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In examples disclosed herein, the training phase and inference phases are integrated, enabling the model to generate action phase sequences based on learnings from training data (e.g., example initial and final configurations for a task) as well as based on sensory information from the real world. By integrating the inference phase and the training phase, example techniques disclosed herein enable a robot to continually improve its ability to execute object manipulation tasks (e.g., using less energy, using less time, etc.) even during execution of object manipulation tasks on the real objects (e.g., after completing training on available training data). Examples disclosed herein may train the model (e.g., action phase probabilities, parameter probabilities, etc.) based on solution state examples by iteratively generating action phase sequences and determining the acceptability of these action phase sequences (e.g. by comparing the outcomes of the action phase sequences to one or more acceptability criteria) in a simulation. Similarly, examples disclosed herein may update the model based on outcomes of a simulated action phase sequence generated for a sensed robot and scene state.

FIG. 1 is an example schematic 100 of an example object manipulation task executed in accordance with techniques disclosed herein. The schematic 100 includes an example initial configuration 102, an example first initial object location 104a, an example second initial object location 104b, an example third initial object location 104c, an example fourth initial object location 104d, an example action phase sequence 106, an example first action phase 108a, an example second action phase 108b, an example third action phase 108c, an example fourth action phase 108d, an example fifth action phase 108e, an example result configuration 110, an example first result object location 110a, an example second result object location 110b, an example third result object location 110c, an example fourth object location 112d, an example goal configuration 114, an example first goal object location 116a, an example second goal object location 116b, an example third goal object location 116c, an example fourth goal object location 116d, and an example cost function output 118.

The initial configuration 102 of the illustrated example of FIG. 1 illustrates an initial configuration of a plurality of objects having initial object locations 104a-d. In some examples, the initial configuration 102 is sensed by a robot using one or more sensors (e.g., cameras, contact sensors on a surface beneath the objects, etc.). In some examples, the initial configuration 102 may include vertical position information (e.g., in a direction into and out of the page as viewed in FIG. 1) to provide three-dimensional object locations. In the initial configuration, the third initial object location 104c indicates an object is on top of an object corresponding to the fourth initial object location 104d.

The action phase sequence 106 of the illustrated example of FIG. 1 illustrates the action phases 108a-e executed to transition the initial configuration 102 to the result configuration 110 in an attempt to move the objects to the goal configuration 114. Ones of the action phases 108a-e correspond to specific action phase controllers, denoted as $A_0$ (first action phase controller), $A_1$ (second action phase controller), etc. The action phase controllers correspond to the action phases 108a-e of the action phase sequence 106. Action phases, also referred to as primitives, perform an action (e.g., grasp, move, release, etc.). Action phase controllers, as used herein, control the use of specific actions a robot can take. In some examples, the action-phase controllers correspond to specific parts of the robot (e.g., an end-effector, an arm). In some examples, the action-phase controllers correspond to specific action phases (e.g., move, grasp, release, etc.) which can be executed by one or more parts of the robot. Ones of the action phases 108a-e are associated with parameters, denoted as $\theta_0$ (parameter of the first action phase controller $A_1$), $\theta_1$ (parameter of the second action phase controller $A_2$), etc. In some examples, the parameters correspond to a speed, acceleration, torque, and/or any other parameters to control operation of the action phase controllers.

The result configuration 110 of the illustrated example of FIG. 1 illustrates the result object locations 112a-d after executing the action phase sequence 106. In the illustrated example of FIG. 1, the result object locations 112a-d of the result configuration 110 are substantially different from the goal object locations 116a-d of the goal configuration 114, and thus, the cost function output 118 (denoted as "L" in FIG. 1) calculated based on this difference may result in an update of one or more probabilities and/or parameters utilized to generate the action phase sequence, enabling iteration toward the goal configuration 114. The cost function output 118 may be calculated in response to the result configuration 110 not satisfying one or more acceptability criteria relative to the goal configuration 114. In some examples, the cost function output 118 is always calculated, enabling improvement of probabilities and/or parameters associated with generating the action phase sequence to improve accuracy and efficiency even when the acceptability criteria have been satisfied. The cost function output 118 may be a function of energy usage, time usage, and/or any other desirable characteristics of the object manipulation performance. For example, the cost function output 118 may be designed to emphasize completing the transformation from the initial configuration 102 to the goal configuration 114 while minimizing execution time.

In example techniques disclosed herein, when the result configuration 110 does not satisfy one or more acceptability criteria with respect to the goal configuration 114, a gradient descent technique can be utilized to iterate the action phases (e.g., iterate both the action phase and the parameters controlling the action phases) until the one or more acceptability criteria are satisfied.

Figure 2:
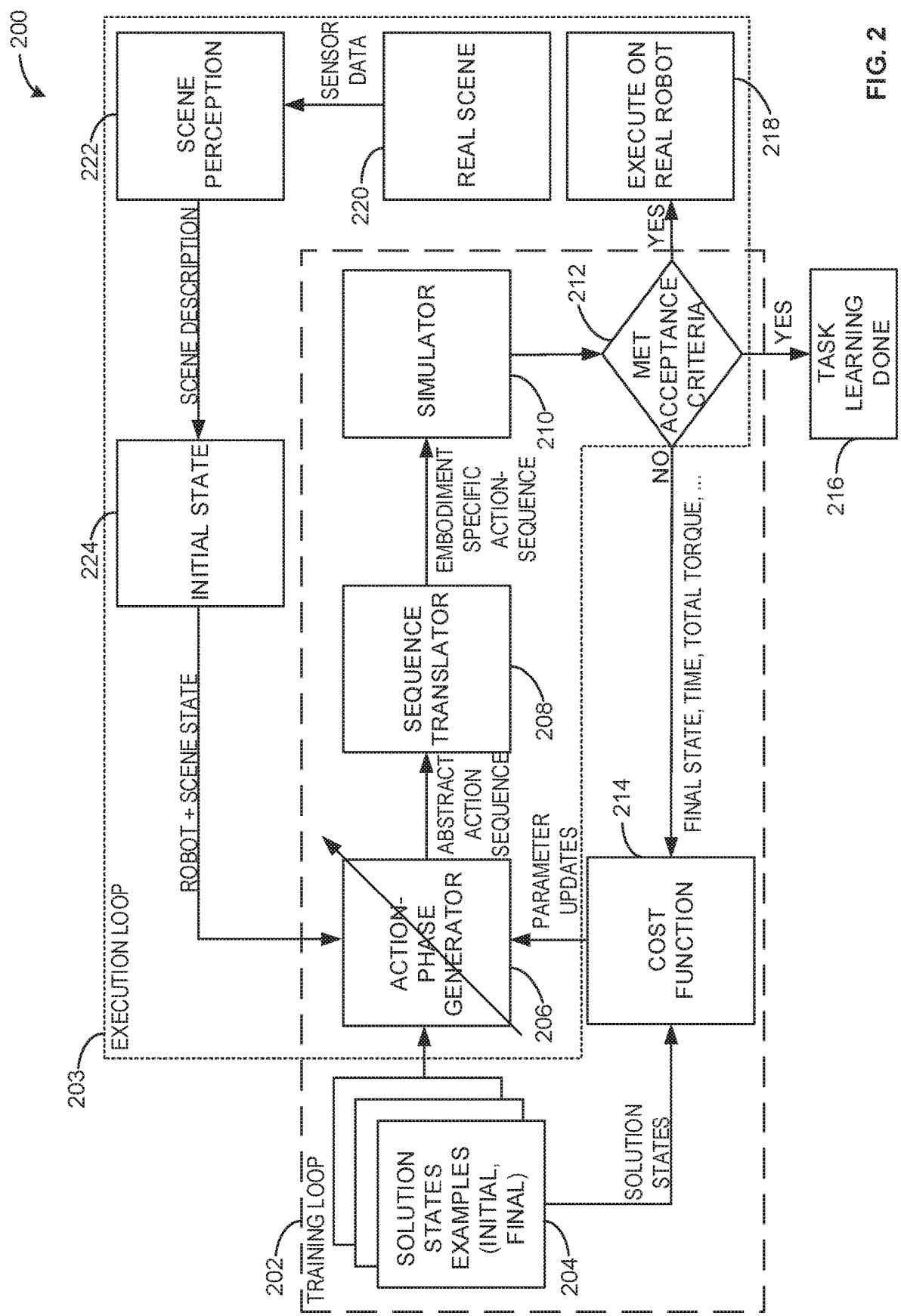
FIG. 2 is a diagram of an example training loop and an example execution loop developed in accordance with techniques disclosed herein for object manipulation.

FIG. 2 is a diagram 200 of an example training loop 202 and an example execution loop 203 developed in accordance with techniques disclosed herein for object manipulation.

The training loop 202 includes example solution state examples 204. The solution state examples 204 includes images or other data corresponding to initial and final states of an object manipulation to be performed. In some examples, prior to executing the object manipulation task on the robot, a plurality of the solution state examples 204 are input as training data to teach the robot how to perform the object manipulation task. In some examples, the solution state examples 204 may not be available, and the robot may need to learn to execute the task based on real world sensory data (e.g., without training data). During execution of the training loop 202, initial states included in the solution state examples 204 are input to an example action phase generator 206 to generate action phase sequences, and final states included in the solution state examples 204 are input to an example cost function 214 to calculate a difference between the outcome of the generated action phase sequences and the final states of the solution state examples 204. In some examples, the solution state examples 204 include position and orientation data (e.g., 6-dimensional position and orientation data) for objects in the initial and final states of the solution state examples 204.

The training loop 202 and the execution loop 203 include an example action phase generator 206 of the illustrated example of FIG. 2 generates action phase sequences by sequentially selecting action phases and/or action phase parameters based on probabilities. In some examples, the action phase generator 206 sequentially samples from conditional probability tables to select action phases and generate an action phase sequence. The action phase generator 206 determines one or more parameters corresponding to the action phases (e.g., speed, torque, etc.). In some examples, the action phase generator 206 iteratively updates probabilities (e.g., represented in conditional probability tables) associated with the action phases and/or the action phase parameters to reduce an output of the cost function 214 (e.g., via Stochastic Gradient Descent). Detail of an implementation of the action phase generator 206 is illustrated and described in connection with FIG. 3.

The training loop 202 and the execution loop 203 include an example sequence translator 208 of the illustrated example of FIG. 2 determines hardware-specific action phase sequence instructions based on the hardware independent action phase sequence generated by the action phase generator 206. For example, different robots may utilize different sensors and actuators, and thus the generic action phase sequences generated by the action phase generator 206 need to be converted and tested for use on a specific robot. In some examples, the action phase generator is configured to generate hardware-specific action phase sequence instructions based on knowledge of specifications of the robot to execute the action phase sequence. Detail of an implementation of the sequence translator 208 is illustrated and described in connection with FIG. 3.

The training loop 202 and the execution loop 203 include an example simulator 210 of the illustrated example of FIG. 2 simulates execution of action phase sequences generated by the action phase generator 206. In some examples, the simulator 210 generates a simulation of the robot to be used, a simulation of the environment (e.g., generated based on an initial state from the solution state examples 204 or robot and scene state data sensed by the robot), and a simulation of the objects present in the environment. In some examples, the simulator 210 includes simulated controllers corresponding to controllers on the real robot. The simulator 210 executes the action phase sequence after it is translated by the sequence translator 208, and provides a final state of the objects after executing the embodiment-specific (e.g., robot-specific) action sequence. In some examples, the simulator 210 can simulate action of action phase sequences in the execution loop 203 to filter out unwanted control commands before execution of the action phase sequence on the real robot. Detail of an example implementation of the simulator 210 is illustrated and described in FIG. 3.

The training loop 202 and the execution loop 203 include an example decision block 212 to determine whether acceptance criteria have been met. For example, the acceptance criteria may correspond to whether a quantity of difference between a final configuration of objects and a goal configuration of objects satisfies a threshold. In some examples, there may be a plurality of acceptance criteria analyzed (e.g., position of the objects relative to goal position, amount of time to execute the action phase sequence, amount of energy consumed to execute the action phase sequence, etc.). In response to the one or more acceptance criteria being satisfied, the learning phase can be concluded (e.g., at example outcome 216) and/or the action phase sequence can be executed on a real robot (e.g., at example outcome 218). In some examples, when the outcome 216 is achieved and training is complete, a robot begins processing an example real scene 220 to execute an object manipulation task in the real world. In some examples, after learning is completed (at outcome 216), learning can be re-initiated when additional ones of the solution state examples 204 are received (e.g., as provided by an operator) or when new robot and scene data are perceived from the real-world via sensors.

The execution loop 203 includes an example real scene 220, which includes a plurality of sensor data captured to identify a scene of a workspace to be utilized by the robot to execute an object manipulation task. For example, the real scene 220 may include images or force sensor data to determine one or more objects present in a workspace. An example implementation of a sensor data receiver to receive sensor data corresponding to the real scene 220 is illustrated and described in connection with FIG. 3. The real scene 220 is communicated to an example scene perception component 222, which converts raw sensor data into a scene description suitable for use by the simulator 210. For example, the scene perception component 222 may determine geometric descriptions of objects, the environment, and dynamic properties of the objects (e.g., mass, inertia, matrix, friction coefficients, etc.). An example implementation of a scene description generator to generate the scene description is illustrated and described in connection with FIG. 3. Once scene description data has been generated, an example initial state 224 including the scene description data can be communicated to the action phase generator 206 to generate an action phase sequence to convert an initial configuration to a goal configuration.

Figure 3:
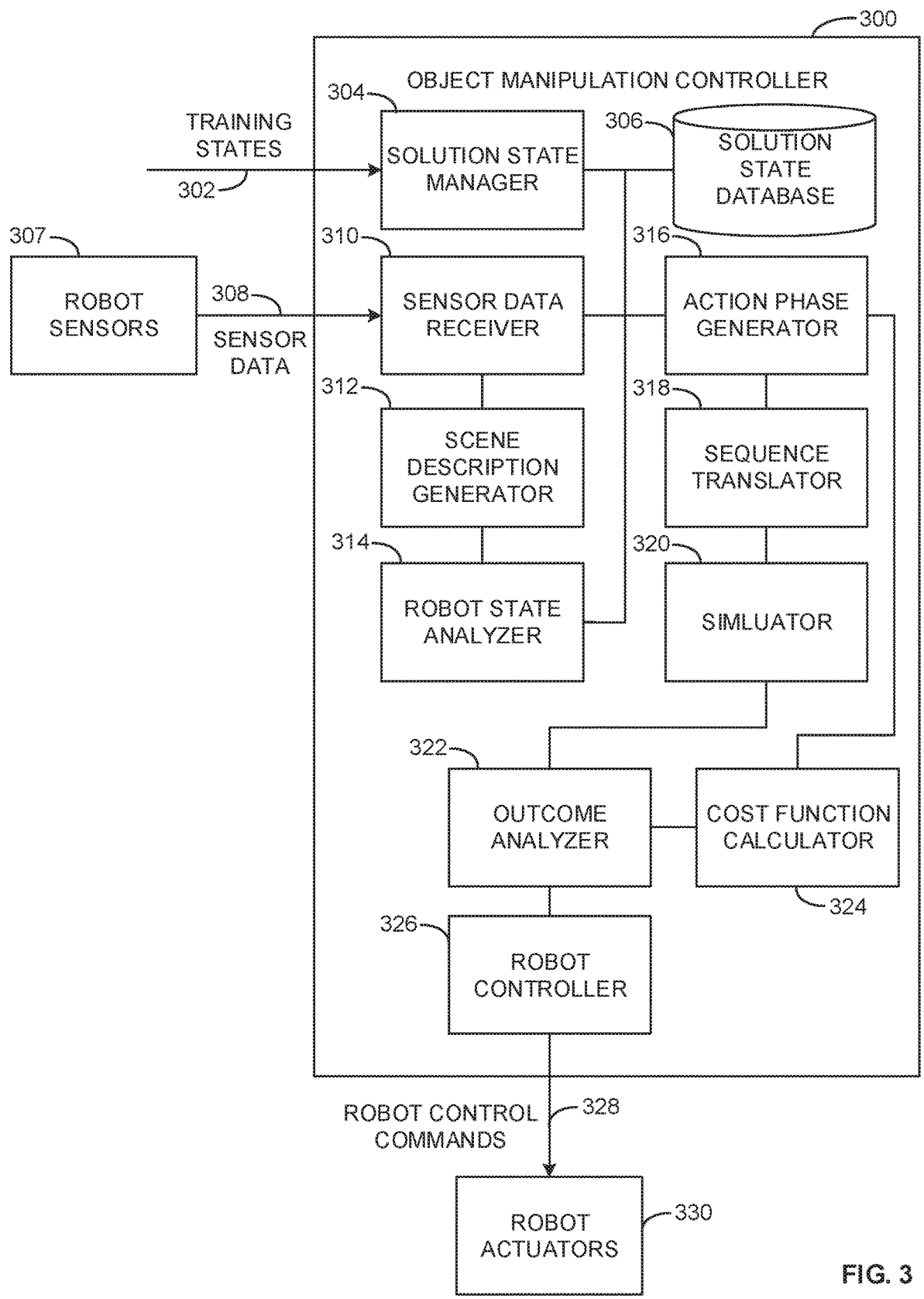
FIG. 3 is block diagram of an example object manipulation controller to execute the training loop and execution loop of FIG. 2.

FIG. 3 is block diagram of an example object manipulation controller 300 to execute the training loop and execution loop of FIG. 2. The example object manipulation controller 300 may be implemented as part of a robot and/or separate from, but in communication with, a robot. In some examples, the object manipulation controller 300 is one or more computing devices directly connected to a robot. In some examples, the object manipulation controller 300 includes one or more computing devices integral to a robot. In some examples, the object manipulation controller 300 communicates with a robot via a network (e.g., the Internet, a local area network, etc.). The object manipulation controller 300 of FIG. 3 includes an example solution state manager 304, an example solution state database 306, an example sensor data receiver 310, an example scene description generator 312, an example robot state analyzer 314, an example action phase generator 316, an example sequence translator 318, an example simulator 320, an example outcome analyzer 322, an example cost function calculator 324, and an example robot controller 326.

The example solution state manager 304 of the illustrated example of FIG. 3 accesses example training states 302. The training states 302 of the illustrated example include initial and final configurations for an object manipulation task to be performed by a robot. In some examples, the training states 302 include images, two-dimensional object position data, three-dimensional object position data, and/or any other data to indicate initial and final object configurations for an object manipulation task. For example, the solution state manager 304 may access, store and/or communicate the solution states examples 204 of the illustrated example of FIG. 2. In some examples, the solution state manager 304 can communicate the training states 302 to the solution state database 306 to be stored for subsequent use. In some examples, the solution state manager 304 communicates an initial training state in the training states 302 to the action phase generator 316 (e.g., to be used to generate action phase sequences for training the object manipulation controller 300) and/or communicates a final state in the training states 302 to the outcome analyzer 322 (e.g., to be used to compare with an outcome of a simulated action phase sequence to determine if an action phase sequence is acceptable).

The example solution state database 306 of the illustrated example of FIG. 3 stores the training states 302. In some examples, the action phase generator 316, the outcome analyzer 322, and/or another component of the object manipulation controller 300 accesses the training states 302 from the solution state database 306. In some examples, the solution state database 306 is accessible via a network. The solution state database 306 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a nonvolatile memory (e.g., flash memory). The solution state database 306 may additionally or alternatively be implemented by one or more double data rate (DDR) memories, such as DDR, DDR2, DDR3, mobile DDR (mDDR), etc. The solution state database 306 may additionally or alternatively be implemented by one or more mass storage devices such as hard disk drive(s), compact disk drive(s) digital versatile disk drive(s), etc. While in the illustrated example the solution state database 306 is illustrated as a single database, the solution state database 306 may be implemented by any number and/or type(s) of databases. Furthermore, the data stored in the solution state database 306 may be in any data format such as, for example, binary data, comma delimited data, tab delimited data, structured query language (SQL) structures, etc.

The example sensor data receiver 310 of the illustrated example of FIG. 3 accesses example sensor data 308 from example robot sensors 307. The robot sensors 307 may include one or more sensors of any type in communication with a robot. For example, the robot sensors 307 can include a touch sensor, a force sensor, a vision sensor, a proximity sensor, an orientation sensor, a heat sensor, a light sensor, a sound sensor, a chemical sensor, a motion sensor, and/or any other type of sensor.

The sensor data receiver 310 of the illustrated example of FIG. 3 receives the sensor data 308 from the robot sensors 307. For example, the sensor data receiver 310 can receive camera data, force sensor data, weight sensor data, motion data, and/or any other data to perceive one or more of the environment and/or objects present in the environment. In some examples, the sensor data receiver 310 communicates the sensor data 308 to the scene description generator 312.

The example scene description generator 312 of the illustrated example of FIG. 3 converts the sensor data 308 into a scene description suitable for the simulator 320, the action phase generator 316, and/or any other component of the object manipulation controller 300. The scene description generator 312 determines an initial state of a scene based off the sensor data 308. In some examples, the scene description generator 312 determines a final state of a scene based off the sensor data 308 after an object manipulation task has been performed. In some such examples, the final state is communicated to the outcome analyzer 322 to determine whether the task has been acceptably completed. In some examples, the scene description generator 312 determines description of the geometry of objects in the environment, description of the environment, and/or description of dynamic properties of objects (e.g., mass, inertia, friction coefficients, etc.).

The example robot state analyzer 314 of the illustrated example of FIG. 3 determines a state of a robot to execute an object manipulation task. The robot state can include a position of one or more components of the robot (e.g., a three-dimensional position of an end-effector, an orientation of an arm, etc.). The robot state analyzer 314 of the illustrated example communicates the robot state to the action phase generator 316 to enable an action phase sequence to be generated that begins at the current position of the robot.

The example action phase generator 316 of the illustrated example of FIG. 3 generates action phase sequences for a robot to perform an object manipulation task. The action phase generator 316 of the illustrated example communicates action phase sequences to the sequence translator 318 to be translated to an embodiment-specific (e.g., robot-specific) action sequence that can then be input to the simulator 320 to determine acceptability of the action sequence. The action phase generator 316 of the illustrated example selects action phases based on conditional probabilities. For example, the action phase generator 316 can select a second action phase to be executed after a first action phase based on which of several possible action phases (e.g., move, grasp, release, etc.) has a highest probability of following the first action phase. The action phase generator 316 of the illustrated example selects one or more parameters for action phases. For example, the parameters may include a three-dimensional position, a three-dimensional velocity, a three-dimensional acceleration, a torque, a wrench value, a distance, a trajectory and/or any other specifications for executing an action phase. The action phase generator 316 updates the probabilities associated with the action phases when the outcome analyzer 322 determines that an acceptability criterion has not been satisfied. In some examples, the action phase generator 316 additionally updates the probabilities associated with action phases even when the acceptability criteria are satisfied based on an output of a cost function from the cost function calculator 324 to continually improve the functioning of the action phase generator 316 to generate accurate and efficient action phases. In some examples, the action phase generator 316 iteratively updates parameters associated with the action phases. The action phase generator 316 of the illustrated example utilizes a gradient descent technique to adjust parameters and/or probabilities associated with action phases.

In some examples, the action phase generator 316 utilizes one or more conditional probability tables to select action phases when generating an action phase sequence. In some such examples, the conditional probability tables may include probabilities of an action phase following another action phase. In some examples, the action phase generator 316 utilizes conditional probabilities that specify specific action phase and parameter combinations. Examples of conditional probability tables that may be utilized by the action phase generator 316 are illustrated and described in connection with FIGS. 6A-6B.

One example procedure that can be implemented by the action phase generator 316 to generate action phase sequences is illustrated below in Equations 1-5. The action phase generator 316 specifies a set of action-phase controllers: $A_\phi \in \{0_{\phi 0}, \ldots, a_{\phi a}\}$ where each element "$a_\Phi$" of "A" is a generic action-phase controller parameterized by "$\phi$." First, in Equation 1, conditional probability tables are generated that represent the likelihood of an action phase j following an action phase i parameterized by "$\theta$," where R is the domain of real numbers.

$$P_\theta(a_i | a_j) \in R^{|A| \times |A|} \quad \text{Equation 1}$$

In Equation 2, a number of phases is determined, where "n" is the number of phases and "$\mu$" is a parameter representing the mean of the probability distribution used to sample the number of action phases that will form the action phase sequence. While a normal probability distribution is used in Equation 2, any probability distribution may be utilized to determine a number of phases.

$$n \sim [\mu + \text{Normal}(0,1)] \quad \text{Equation 2}$$

Once a number of phases is determined, "n" conditional probability tables are generated and are initialized with uniform probability parameters in accordance with Equation 3, where "$\theta$" is the set of parameters that describe the conditional probability table and the parameters of each primitive, and $\phi$ is a set of parameters of an action primitive (e.g., an action phase).

$$\theta = \frac{1}{n}, \Phi = P(\Phi) \qquad \text{Equation 3}$$

In Equation 4, an action phase sequence, "π," is generated, based on sequentially sampling from the conditional probability tables. In equation 4, "$P_\theta$" corresponds to a conditional probability distribution parameterized by the set of parameters, "θ."

$$\pi = P_{\theta(1)}(a_0)P_{\theta(2)}(a_0) \ldots P_{\theta(n)}(a_n|a_{n-1}) \qquad \text{Equation 4}$$

Once the action phase sequence has been generated, it is simulated by the simulator 320 and the cost function is calculated by the cost function calculator 324 to determine an effectiveness of the action phase sequence. Example equations to calculate the cost function are described below in connection with the outcome analyzer 322 of FIG. 3.

In Equation 5, gradients are calculated with respect to the conditional probability tables and the number of phases and an optimization step is performed to update the conditional probability tables and parameters utilized by the action phase generator 316. In equation 5, $\alpha_\theta$ corresponds to a learning rate with respect to θ and $\alpha_\mu$ corresponds to a learning rate with respect to μ. For example, different learning rates can be utilized for parameters with different semantics.

$$\theta = \theta + \alpha_\theta \nabla \theta, \mu = \mu + \alpha_\mu \nabla \mu \qquad \text{Equation 5}$$

In some examples, the action phase generator 316 continually generates action phases (e.g., using equation 4) and updates the conditional probability tables and parameters using gradient descent (e.g., using equation 5) with respect to the cost function.

The action phase generator 316 of the illustrated example can utilize equations 1-5 and/or any other equations or algorithms to generate and optimize action phase sequences.

The sequence translator 318 of the illustrated example of FIG. 3 converts the action phase sequences generated by the action phase generator 316 to hardware-specific action phase sequences that can be directly utilized by a robot. For example, the sequence translator 318 can convert action phase sequences from the action phase generator 316 to a format that can be directly implemented by the specific sensors, actuators and/or other hardware of the robot to execute the object manipulation task. In some examples, the sequence translator 318 may be integrated in the action phase generator 316 to enable the action phase generator 316 to output ready-to-use action phase sequences. In some examples, the action phase generator 316 is configured to generate action phase sequences for a specific type of robot. The sequence translator 318 of the illustrated example communicates the hardware-specific action phase sequences to the simulator 320 and/or the robot controller 326.

The simulator 320 of the illustrated example of FIG. 3 simulates execution of action phase sequences. The simulator 320 of the illustrated example generates a simulation robot that is a replica to the real robot to be utilized for the object manipulation task. In some examples, the simulator 320 of the illustrated example generates a simulation including the environment and any objects present in the environment (e.g., as determined by the sensor data receiver 310 and/or the scene description generator 312). The simulator 320 of the illustrated example can determine a final state of one or more objects after executing the action phase sequence. In some examples, the simulator 320 determines one or more metrics associated with executing the action phase sequence, such as an elapsed time to complete the action phase sequence, elapsed time for individual action phases, torque, energy usage, peak force and/or any other metric useful to determining an efficacy of an action phase sequence. In some examples, the metrics calculated by the simulator 320 depend on the cost function utilized by the cost function calculator 324. In some examples, during training, the simulator 320 is used to convert an initial training state into a final training state to analyze an action phase sequence and, during execution, the simulator 320 is used to filter out unwanted control commands and improve metrics associated with the action phase sequence to reduce an output of the cost function.

The outcome analyzer 322 determines whether an outcome of an action phase sequence executed by the simulator 320 or by the robot (e.g., in response to the robot control commands 328) satisfies one or more acceptability criteria. For example, the outcome analyzer 322 may compare an image (and/or other data) of the outcome of executing the action phase sequence with an image (and/or other data) of a solution state. The outcome analyzer 322 determines one or more acceptability criteria are satisfied. The acceptability criteria may include an elapsed time to complete the action sequence, a tolerance to a goal configuration (e.g., percent difference to data corresponding to a goal configuration), a maximum torque applied, a maximum velocity of a component of the robot, a maximum acceleration of a component of the robot, and/or any other metrics determined by an operator. In some examples, the acceptability criteria may be flexible and embodiment-specific (e.g., particular to a type of hardware on the robot) or task-specific (e.g., particular to a type of object manipulation task being performed), enabling customization and complexity. In some examples, the outcome analyzer 322 can dynamically learn and determine acceptability criteria based on a task to be executed and/or a type of robot being utilized.

In some examples, the outcome analyzer 322 communicates with the robot controller 326 when the outcome analyzer 322 determines that that the simulated outcome of executing an action phase sequence satisfied the one or more acceptability criteria, thereby causing the robot controller 326 to execute the action phase sequence with the robot. In some examples, the outcome analyzer 322 communicates with the action phase generator 316 when the outcome analyzer 322 determines that the simulated outcome of executing an action phase sequence did not satisfy the one or more acceptability criteria, thereby causing the action phase generator 316 to update one or more action phases and/or parameters associated with the action phases.

The example cost function calculator 324 of the illustrated example of FIG. 3 calculates a cost function output based on an outcome of executing an action phase sequence. In some examples, the cost function is utilized as the basis for conducting gradient descent to improve probabilities associated with one or more action phases and/or parameters. The cost function utilized by the cost function calculator 324 can be a function of goal completion, energy, time minimization, and/or any other metrics.

An example simple cost function that can be utilized by the cost function calculator 324 is represented in Equation 6, where $C_g$ is the goal configuration and $C_r$ is the resulting configuration (e.g., the actual final configuration).

$$L(\mu,\theta,\Phi) = \|C_g - C_r\|_2^2 \qquad \text{Equation 6}$$

In some examples, the cost function calculator 324 includes additional variables. An example cost function accounting for numerous metrics is represented in Equation 7, where "t" is time, "τ" is torque, and "γ" and "φ" are weight parameters.

$$L(\mu,\theta,\Phi)=\|C_g-C_r\|_2^2+\gamma t+\varphi\int_0^t \tau dt \qquad \text{Equation 7}$$

The cost function calculator 324 of the illustrated example communicates cost function outputs to the action phase generator 316. In some examples, the action phase generator 316 communicates with the cost function calculator 324 to determine how changing action phase probabilities and/or parameters will affect the cost function outputs (e.g., to calculate gradients).

The example robot controller 326 of the illustrated example of FIG. 3 communicates the robot control commands 328 to example robot actuators 330 to cause a robot to execute an action phase sequence. For example, the robot control commands 328 can cause the robot actuators 330 of the robot to move, grasp, release, push, etc. In some examples, the robot controller 326 issues the robot control command 328 when the outcome of executing the action phase sequence on the simulator 320 satisfies one or more acceptability criteria.

The example robot actuators 330 can include one or more hydraulic actuators, piezoelectric actuators, pneumatic actuators, and/or any other type of actuator. In some examples, the robot controller 326 communicates the robot control commands 328 to another controller of the robot to cause the robot actuators 330 to execute the action phase sequence.

Figure 8:
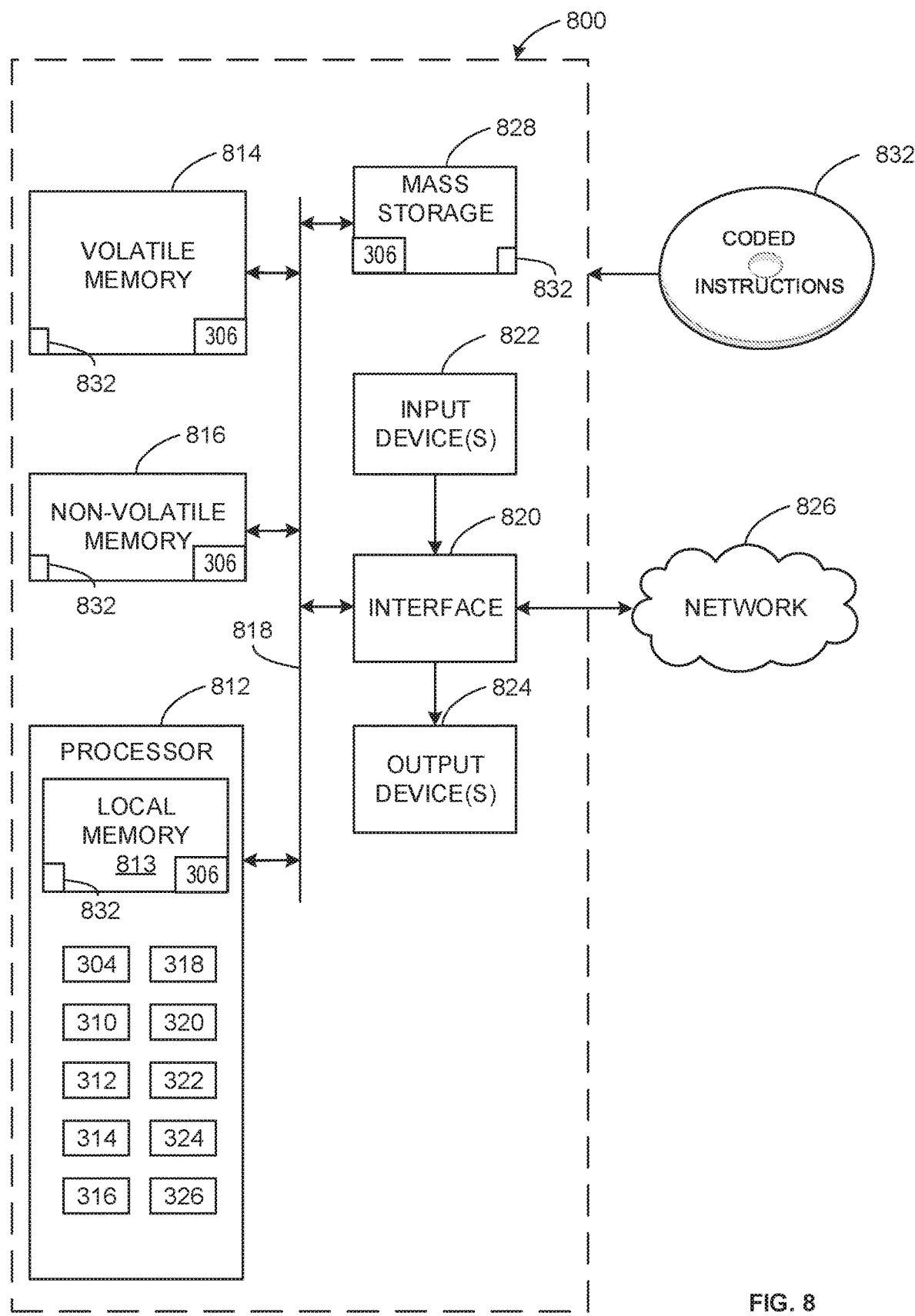
FIG. 8 is a block diagram of an example processing platform that may execute the instructions of FIGS. 4-5 to implement the object manipulation controller of FIG. 3.

While an example manner of implementing the object manipulation controller 300 of FIG. 3 is illustrated in FIG. 8, one or more of the elements, processes and/or devices illustrated in FIG. 8 may be combined, divided, re-arranged, omitted, eliminated and/or implemented in any other way. Further, the example solution state manager 304, the example solution state database 306, the example sensor data receiver 310, the example scene description generator 312, the example robot state analyzer 314, the example action phase generator 316, the example sequence translator 318, the example simulator 320, the example outcome analyzer 322, the example cost function calculator 324, the example robot controller 326 and/or, more generally, the example object manipulation controller 300 of FIG. 3 may be implemented by hardware, software, firmware and/or any combination of hardware, software and/or firmware. Thus, for example, any of the example solution state manager 304, the example solution state database 306, the example sensor data receiver 310, the example scene description generator 312, the example robot state analyzer 314, the example action phase generator 316, the example sequence translator 318, the example simulator 320, the example outcome analyzer 322, the example cost function calculator 324, the example robot controller 326 and/or, more generally, the example object manipulation controller 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example solution state manager 304, the example solution state database 306, the example sensor data receiver 310, the example scene description generator 312, the example robot state analyzer 314, the example action phase generator 316, the example sequence translator 318, the example simulator 320, the example outcome analyzer 322, the example cost function calculator 324, the example robot controller 326 is/are hereby expressly defined to include a non-transitory computer readable storage device or storage disk such as a memory, a digital versatile disk (DVD), a compact disk (CD), a Blu-ray disk, etc. including the software and/or firmware. Further still, the example object manipulation controller 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
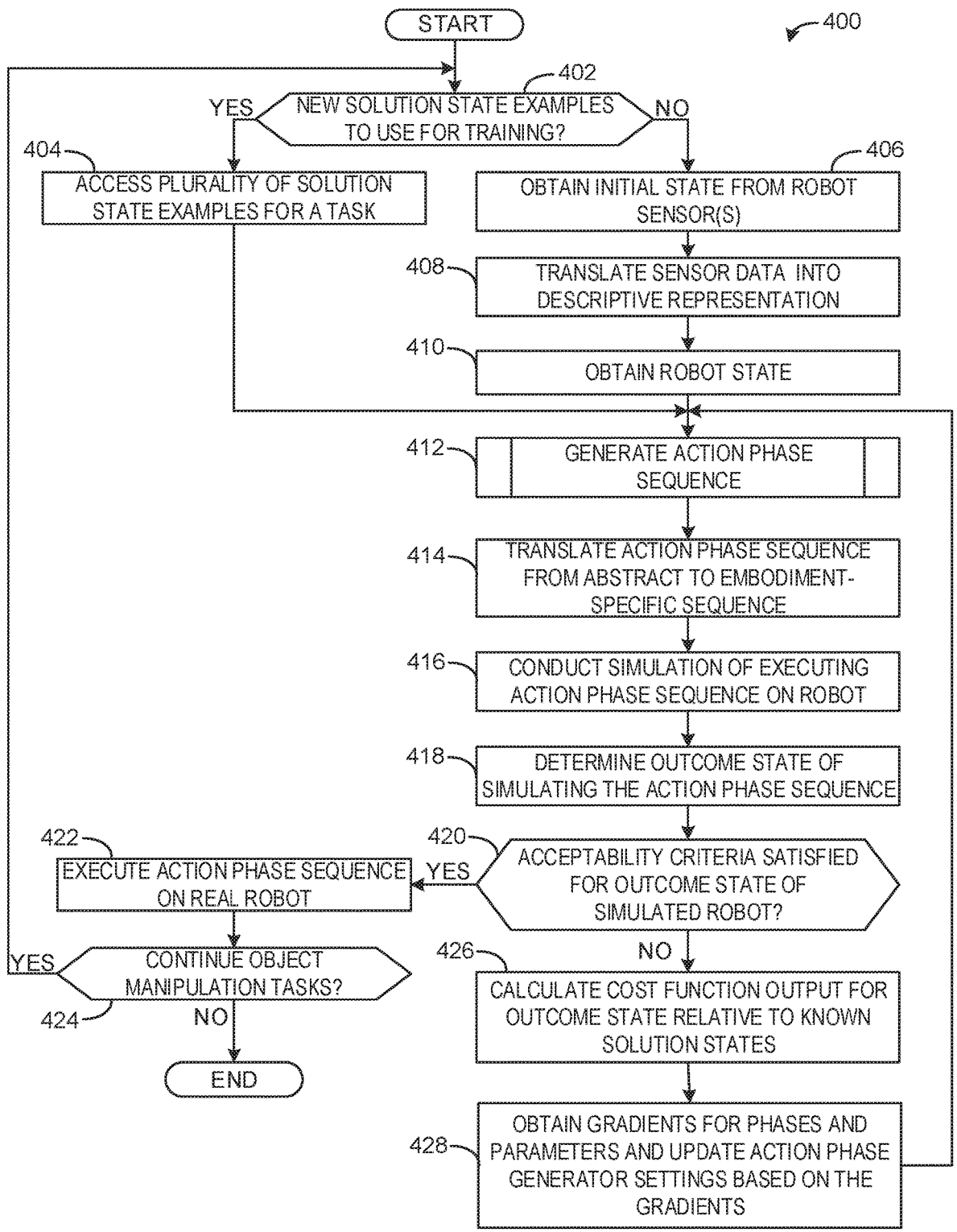
FIG. 4 is a flowchart representative of machine readable instructions that may be used to implement the object manipulation controller of FIG. 3 to execute an object manipulation task.
Figure 5:
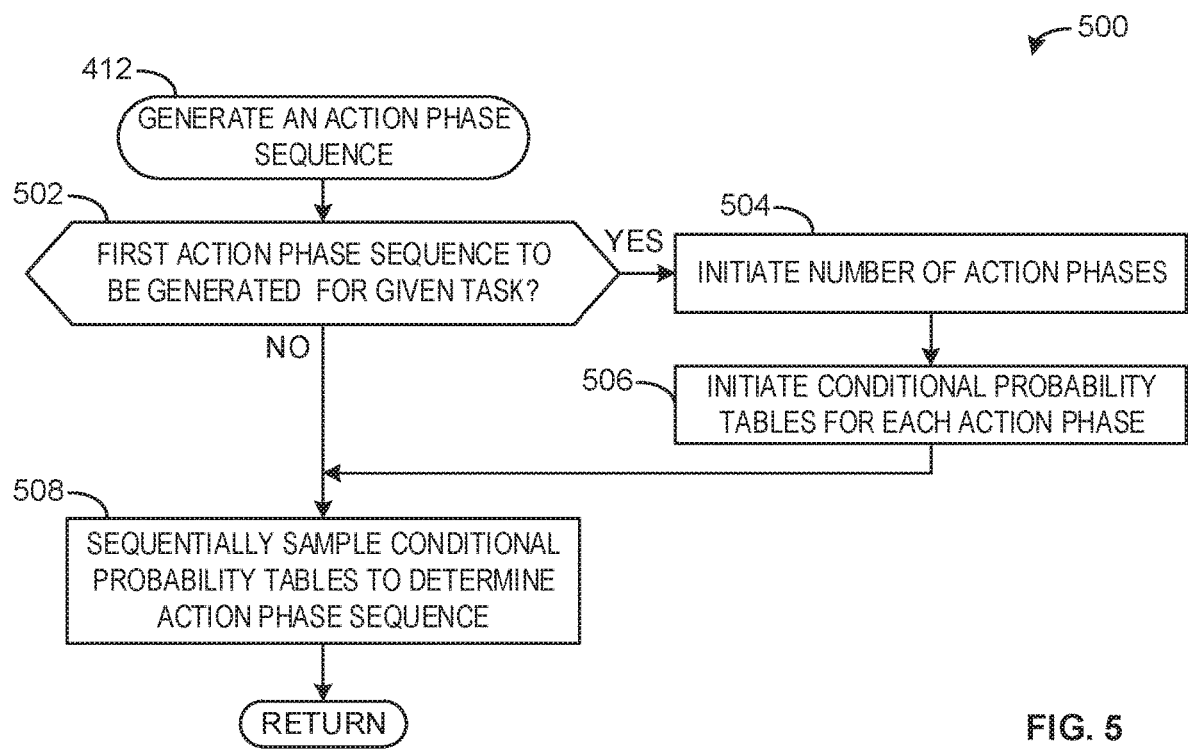
FIG. 5 is a flowchart representative of machine readable instructions that may be used to implement the object manipulation controller of FIG. 3 to generate an action phase sequence.

Flowcharts representative of example hardware logic, machine readable instructions, hardware implemented state machines, and/or any combination thereof for implementing the object manipulation controller 300 of FIG. 3 are shown in FIGS. 4-5. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-5, many other methods of implementing the example object manipulation controller 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions that may be used to implement the object manipulation controller 300 of FIG. 3 to execute an object manipulation task. With reference to the preceding figures and associated descriptions, the example machine readable instructions 400 of FIG. 4 begin with the example object manipulation controller 300 determining if there are new solution state examples to use for training (Block 402). In some examples, the solution state manager 304 determines if there are new solution state examples to use for training. In some examples, the solution state manager 304 determines if there are new solution state examples in the solution state database 306 to use for training. In response to there being new solution state examples to use for training, processing transfers to block 404. Conversely, in response to there not being new solution state examples to use for training, processing transfers to block 406.

The example object manipulation controller 300 accesses a plurality of solution state examples for a task (Block 404). In some examples, the solution state manager 304 accesses the plurality of solution state examples for a task. For example, the solution state examples can include data indicating an initial state (e.g., prior to completing an object manipulation task) and a final state (e.g., after completing the object manipulation task).

The example object manipulation controller 300 obtains an initial state from one or more robot sensor(s) (Block 406). In some examples, the sensor data receiver 310 obtains data corresponding to an initial state from one or more of the robot sensor(s). The sensor data may include images, force data, weight data, and/or any other data to determine features of an environment, such as objects present in the environment.

The example object manipulation controller 300 translates sensor data into a descriptive representation (Block 408). In some examples, the scene description generator 312 translates the sensor data into a descriptive representation. In some examples, the scene description generator 312 determines three-dimensional positions of objects based on the sensor data to determine an initial state of the environment in which an object manipulation task is to be performed.

The example object manipulation controller 300 obtains a robot state (Block 410). In some examples, the robot state analyzer 314 determines a state of a robot to perform the object manipulation task. For example, the robot state analyzer 314 may determine a current position of one or more arms, end-effectors, and/or other components of the robot.

The example object manipulation controller 300 generates an action phase sequence (Block 412). In some examples, the action phase generator 316 generates an action phase sequence. Example approaches for generating action phase sequences are disclosed in further detail in connection with FIG. 5.

The example object manipulation controller 300 translates an action phase sequence from an abstract representation to an embodiment—specific action phase sequence (Block 414). In some examples, the example sequence translator 318 translate the action phase sequence from an abstract representation to an embodiment-specific (e.g., robot-specific) representation. In some examples, the sequence translator 318 determines robot specifications and/or a current state of a robot from the robot state analyzer 314 and generates an action phase sequence that is specific to the specifications and/or state of the robot.

The example object manipulation controller 300 conducts a simulation of executing the action phase sequence on a robot (Block 416). In some examples, the simulator 320 conducts a simulation of executing the action phase sequence on a simulated robot that has the same specifications and/or specific state as the real robot that will execute the action phase sequence. For example, the simulator 320 can generate a plurality of objects in an initial state based on an initial state represented in the training states 302 or in the sensor data 308 and conduct a simulation of executing the action phase sequence generated by the action phase generator 316 on the plurality of objects.

The example object manipulation controller 300 determines an outcome state of simulating the action phase sequence (Block 418). In some examples, the simulator 320 determines an outcome state of simulating the action phase sequence. For example, the outcome state may include an image and/or other data to indicate three-dimensional object positions after the action phase sequence was executing.

The example object manipulation controller 300 determines whether one or more acceptability criteria are satisfied for the outcome state of the simulated robot (Block 420). In some examples, the outcome analyzer 322 determines whether the one or more acceptability criteria have been satisfied for the outcome state of the simulated robot. In some examples, the outcome analyzer 322 determines whether the outcome state of the simulator 320 satisfies a threshold of similarity with a solution state. In some examples, the outcome analyzer 322 determines whether one or more other metrics are satisfied (e.g., energy consumption, maximum torque, maximum speed, etc.). In response to the acceptability criteria being satisfied for the outcome state of the simulated robot, processing transfers to block 422. Conversely, in response to the acceptability criteria not being satisfied for the outcome state of the simulated robot, processing transfers to block 426.

The example object manipulation controller 300 executes the action phase sequence on the real robot (Block 422). In some examples, the robot controller 326 generates the robot control commands 328 to cause the robot to execute the action phase sequence.

The example object manipulation controller 300 determines whether to continue object manipulation tasks (Block 424). In response to continuing object manipulation tasks, processing transfers to block 402. Conversely, in response to not continuing object manipulation tasks, processing terminates.

The example object manipulation controller 300 calculates a cost function output for the outcome state relative to known solution states (Block 426). In some examples, the cost function calculator 324 calculates an output of the cost function for the outcome state. In some examples, the cost function output represents how close the outcome state is to the solution state. In some examples, the cost function output includes other factors as configured by an operator, such as energy usage, maximum torque, maximum volume of the operation, etc.

The example object manipulation controller 300 obtains gradients for phases and parameters and updates action phase generator settings based on the gradients (Block 428). In some examples, the action phase generator 316 calculates gradients for probabilities associated with the action phases and parameters corresponding to the action phases. The gradients represent the effect that adjustments of the probabilities will have on the cost function. The action phase generator 316 adjusts the probabilities and/or parameters in a direction (e.g., increasing or decreasing specific probabilities) to cause the expected cost function output to be reduced.

FIG. 5 is a flowchart representative of machine readable instructions that may be used to implement the object manipulation controller 300 of FIG. 3 to generate an action phase sequence. With reference to the preceding figures and associated descriptions, the example machine readable instructions 500 of FIG. 5 begin with the example object manipulation controller 300 determining if the action phase sequence to be generated is the first action phase sequence to be generated for a given task (Block 502). In some examples, the action phase generator 316 determines if the action phase sequence to be generated is the first action phase sequence to be generated for an object manipulation task. In response to the action phase sequence to be generated being the first action phase sequence to be generated for the given task, processing transfers to block 504. Conversely, in response to the action phase sequence to be generated not being the first action phase sequence to be generated for the given task, processing transfers to block 508.

The example object manipulation controller 300 initiates a number of phases (Block 504). In some examples, the action phase generator 316 initiates a number of actions phases. For example, the action phase generator 316 can utilize Equation 2 to initiate a number of action phases. In some examples, the action phase generated initiates a number of action phases based on a probability distribution.

The example object manipulation controller 300 initiates conditional probability tables for each action phase (Block 506). In some examples, the action phase generator 316 initiates conditional probability tables corresponding to the action phases initiated at block 504. In some examples, the conditional probability tables correspond to transitions between action phases in an action phase sequence. For example, if three action phases are initiated, the action phase generator 316 can generate a first action phase probability table to select a first action phase, a second conditional probability table to transition from the first action phase to the second action phase, and a third conditional probability table to transition from the second action phase to the third action phase.

The example object manipulation controller 300 sequentially samples conditional probability tables to determine an action phase sequence (Block 508). In some examples, the action phase generator 316 sequentially samples conditionally probably tables to determine an action phase sequence. For example, the action phase generator 316 can select action phases based on action phases which have a high probability of following a prior action phase. For example, if a first type of action phase (e.g., move) has an 80% probability of being followed by a second type of action phase (e.g., grasp), 15% probability of being followed by a third type of action phase (e.g., release), and a 5% probability of being followed by a fourth type of action phase (e.g., move), the action phase generator 316 may select the second type of action phase to follow the first type of action phase based on it having the highest probability.

FIG. 6A is an example first probability table 600 for selecting a second action phase following a first action phase of an action phase sequence. The first probability table 600 includes an example first possible first action phase 602a, an example second possible first action phase 602b, and an example third possible first action phase 602c, which each correspond to possibilities for the first action phase of an action phase sequence. The first possible first action phase 602a corresponds to "move," as parameterized by three parameters, "P1, P2, P3." For example, the parameter may correspond to position, velocity, acceleration, torque, and/or any other parameter to characterize the action phase. Similarly, the second possible first action phase 602b corresponds to "grasp" and is parameterized by parameters "P4, P5, P6." The third possible first action phase 602c corresponds to "release" and is parameterized by "P7, P8, P9."

The first probability table 600 additionally includes an example first possible second action phase 604a, an example second possible second action phase 604b, and an example third possible second action phase 604c. The first possible second action phase 604a corresponds to "move," as parameterized by three parameters, "P10, P11, P12." The second possible second action phase 604b corresponds to "grasp" and is parameterized by parameters "P13, P14, P15." The third possible second action phase 604c corresponds to "release" and is parameterized by "P16, P17, P18."

The first probability table 600 includes a plurality of probabilities corresponding to one of the possible second action phases 604a-c following one of the possible first action phases 602a-c. For example, the table indicates that the probability of the first possible second action phase 604a following the first possible first action phase 602a is 0.23, while the probability of the second possible section action phase 604b following the first possible first action phase 602a is 0.61 and the probability of the third possible second action phase 604c following the first possible first action phase 602a is 0.16. In some examples, if the first action phase is determined to be the first possible first action phase 602a, the action phase generator 316 may select the second possible second action phase 604b as the second action phase, since it has the highest probability of the three options (0.61).

In some examples, the parameters may be directly represented in the first probability table 600 as opposed to already selected for the action phases. For example, instead of a single instance of the first possible first action phase 602a, "move," there may be numerous different "move" action phases at incremental levels of the various parameters. Thus, multi-dimensional probability tables can be utilized which include probabilities for a range of action phases and possible parameter combinations. In examples where the parameters for a primitive are defined outside the conditional probability table (e.g., as in the first probability table 600 and the second probability table 606), a plurality of conditional probability tables may be utilized with different instances of parameter specifications for the action phases. In some such examples, when generating an action phase sequence, a plurality of conditional probability tables with different parameter configurations may be utilized to select action phases.

FIG. 6B is an example second probability table 606 for selecting a third action phase of the action phase sequence of FIG. 6A following the second action phase. The second probability table 606 includes the first possible second action phase 604a, the second possible second action phase 604b, and the third possible second action phase 604c. The second probability table 606 further includes an example first possible third action phase 608a, an example second possible third action phase 608b, and an example third possible third action phase 608c. The first, second, and third possible third action phases 608a-c are each parameterized by three individual parameters. In some examples, the action phases are parameterized by any number and/or type of parameters (e.g., as determined by an operator).

The second probability table 606 indicates probabilities of transitioning from one of the first possible second action phase 604a, the second possible second action phase 604b, or the third possible second action phase 604c to one of the first possible third action phase 608a, the second possible third action phase 608b, or the third possible third action phase 608c. In some examples, the probabilities included in the first probability table 600 and the second probability table 606 are continually updated based on cost function outputs from the cost function calculator 324 to improve action phase sequences generated to complete an object manipulation task.

Figure 7:
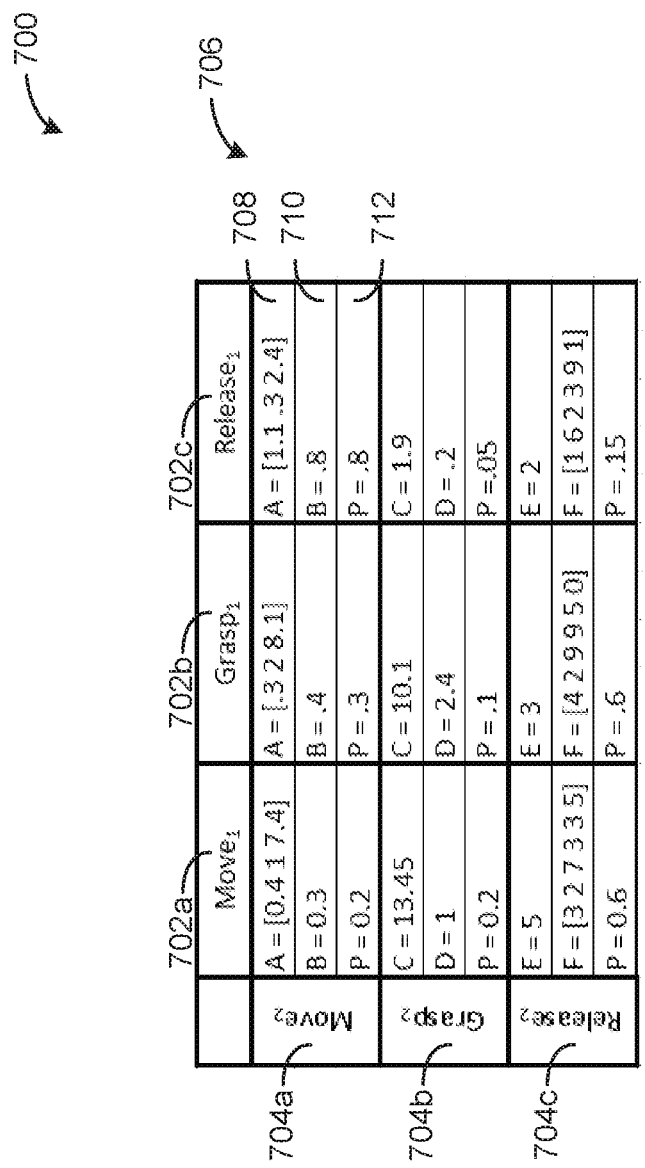
FIG. 7 is an example third probability table including probabilities that can be utilized to select action phases with action phase parameters included in the third probability table.

FIG. 7 is an example third probability table 700 for selecting action phases with action phase parameters included in the third probability table 700. The third probability table 700 includes an example first possible prior action phase 702a an example second possible prior action phase 702b, and an example third possible prior action phase 702c. In the third probability table 700, the first, second and third prior possible action phases 702a-c have already been selected (e.g., one of the first, second, or third possible action phases 702a-c has been selected), and thus parameters for these action phases are not represented in the third probability table 700. The third probability table 700 includes an example first possible subsequent action phase 704a (e.g., "move'), an example second possible subsequent action phase 704b (e.g., "grasp"), and an example third possible subsequent action phase 704c (e.g., "release").

The third probability table 700 includes an example action phase combination 706 corresponding to the first possible subsequent action phase 704a following the third possible prior action phase 702c. The action phase combination 706 includes an example first parameter 708 and an example second parameter 710. When the first parameter 708 and the second parameter 710 are included in the third probability table 700, as illustrated in FIG. 7, the parameters can be iteratively updated by the action phase generator 316 utilizing gradient descent. In the illustrated example of FIG. 7, the first parameter 708 (e.g., A=[1.1 0.3 2.4]) corresponds to three-dimensional location coordinates indicating a position to which a component of the robot should move. In the illustrated example of FIG. 7, the second parameter 710 (e.g., B=0.8) is a velocity, indicating a speed at which the component of the robot should move to the position indicated by the first parameter 708. The first parameter 708 and/or the second parameter 710 may correspond to any operational characteristic defining the first possible subsequent action phase 704a. The third probability table 700 includes additional parameters, indicated by variables A, B, C, D, E, and F. Any number of parameters may be included in the third probability table to define the action phases.

The action phase combination 706 includes an example probability value 712 ("P") corresponding to a probability of the first possible subsequent action phase 704a following the third possible prior action phase 702c. In the illustrate example, the probability value 712 is 0.8 (e.g., 80%). Compared to the illustrated probabilities corresponding to the second or third possible subsequent action phases 704b, 704c following the third possible prior action phase 702c (e.g., 0.05 and 0.15, respectively), the first possible subsequent action phase 704a has the highest probability (0.8). The action phase generator 316 updates probabilities values (including the probability value 712) in the table to reduce an output of the cost function (e.g., via gradient descent).

FIG. 8 is a block diagram of an example processor platform 800 structured to execute the instructions of FIGS. 4-5 to implement the object manipulation controller 300 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example solution state manager 304, the example solution state database 306, the example sensor data receiver 310, the example scene description generator 312, the example robot state analyzer 314, the example action phase generator 316, the example sequence translator 318, the example simulator 320, the example outcome analyzer 322, the example cost function calculator 324, and/or the example robot controller 326.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS, Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832, 400, 500 of FIGS. 4, 5, and 8 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that make robotic programming more efficient and less embodiment dependent, enabling flexible and robust automation of object manipulation processes. Example techniques disclosed herein are adaptable to a wide variety of tasks and generate action phase sequences that are adaptable based on both training data and the sensed real world to enable robotic object manipulation with faster convergence time than traditional object manipulation robots.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Example methods, apparatus, systems, and articles of manufacture for object manipulation via action sequence optimization are disclosed herein. Further examples and combinations thereof include the following:

Example 1 includes an apparatus comprising a scene description generator to determine an initial state of a scene, an action phase generator to generate a first action phase sequence to transform the initial state of the scene to a solution state of the scene, the action phase generator to select a plurality of action phases for the first action phase sequence based on action phase probabilities, an outcome analyzer to determine whether a first simulated outcome of executing the first action phase sequence satisfies an acceptability criterion, and a cost function calculator to, when the first simulated outcome does not satisfy the acceptability criterion, calculate a first cost function output based on a difference between the first simulated outcome and the solution state of the scene, the first cost function output utilized by the action phase generator to generate updated action phase probabilities.

Example 2 includes the apparatus of example 1, wherein the action phases include a plurality of action phase parameters, the action phase generator to update the action phase parameters based on the first cost function output when the first simulated outcome does not satisfy the acceptability criterion.

Example 3 includes the apparatus of example 2, wherein the action phase parameters include at least one of a three-dimensional position, a three-dimensional velocity, or a three-dimensional acceleration.

Example 4 includes the apparatus of example 1, wherein the action phase generator is to generate the updated action phase probabilities based on a gradient-based technique.

Example 5 includes the apparatus of example 1, further including a robot controller to, when the first simulated outcome satisfies the acceptability criterion, cause a robot to execute the first action phase sequence.

Example 6 includes the apparatus of example 1, further including a solution state manager to access an initial training state and a final training state, the action phase generator to generate a second action phase sequence to convert the initial training state to the final training state, the action phase generator to generate the updated action phase probabilities based on a second cost function output when a second simulated outcome of executing the second action phase sequence does not satisfy the acceptability criterion.

Example 7 includes a computer readable storage medium comprising computer readable instructions that, when executed, cause a processor to determine an initial state of a scene, generate a first action phase sequence to transform the initial state of the scene to a solution state of the scene by selecting a plurality of action phases for the first action phase sequence based on action phase probabilities, determine whether a first simulated outcome of executing the first action phase sequence satisfies an acceptability criterion, and when the first simulated outcome does not satisfy the acceptability criterion, calculate a first cost function output based on a difference between the first simulated outcome and the solution state of the scene, the first cost function output utilized to generate updated action phase probabilities.

Example 8 includes the computer readable storage medium of example 7, wherein the action phases include a plurality of action phase parameters, the instructions, when executed, to update the action phase parameters based on the first cost function output when the first simulated outcome does not satisfy the acceptability criterion.

Example 9 includes the computer readable storage medium of example 8, wherein the action phase parameters include at least one of a three-dimensional position, a three-dimensional velocity, or a three-dimensional acceleration.

Example 10 includes the computer readable storage medium of example 7, wherein the instructions, when executed, cause the processor to generate the updated action phase probabilities based on a gradient-based technique.

Example 11 includes the computer readable storage medium of example 7, wherein the instructions, when executed cause a robot to execute the first action phase sequence when the first simulated outcome satisfies the acceptability criterion.

Example 12 includes the computer readable storage medium of example 7, wherein the instructions, when executed, cause the processor to access an initial training state and a final training state, generate a second action phase sequence to convert the initial training state to the final training state, and generate the updated action phase probabilities based on a second cost function output when a second simulated outcome of executing the second action phase sequence does not satisfy the acceptability criterion.

Example 13 includes the computer readable storage medium of example 7, wherein a first probability of the action phase probabilities is stored in a conditional probability table, the first probability corresponding to a second type of action phase following a first type of action phase.

Example 14 includes a method comprising determining an initial state of a scene, generating a first action phase sequence to transform the initial state of the scene to a solution state of the scene by selecting a plurality of action phases for the first action phase sequence based on action phase probabilities, determining whether a first simulated outcome of executing the first action phase sequence satisfies an acceptability criterion, and when the first simulated outcome does not satisfy the acceptability criterion, calculating a first cost function output based on a difference between the first simulated outcome and the solution state of the scene, the first cost function output utilized to generate updated action phase probabilities.

Example 15 includes the method of example 14, wherein the action phases include a plurality of action phase parameters, the method further including updating the action phase parameters based on the first cost function output when the first simulated outcome does not satisfy the acceptability criterion.

Example 16 includes the method of example 15, wherein the action phase parameters include at least one of a three-dimensional position, a three-dimensional velocity, or a three-dimensional acceleration.

Example 17 includes the method of example 14, further including generating the updated action phase probabilities based on a gradient-based technique.

Example 18 includes the method of example 14, further including causing a robot to execute the first action phase sequence when the first simulated outcome satisfies the acceptability criterion.

Example 19 includes the method of example 14, further including accessing an initial training state and a final training state, generating a second action phase sequence to convert the initial training state to the final training state, and generating the updated action phase probabilities based on a second cost function output when a second simulated outcome of executing the second action phase sequence does not satisfy the acceptability criterion.

Example 20 includes the method of example 14, wherein a first probability of the action phase probabilities is stored in a conditional probability table, the first probability corresponding to a second type of action phase following a first type of action phase.

What is claimed is:
1. An apparatus comprising:
   a scene description generator to determine an initial state of a scene;

an action phase generator to:
  generate a first hardware independent action phase sequence to transform the initial state of the scene to a solution state of the scene;
  select a plurality of action phases for the first hardware independent action phase sequence based on action phase probabilities; and
  convert the first hardware independent action phase sequence to a first hardware-specific action phase sequence based on one or more specifications of a robot that is to execute the first hardware independent action phase sequence;
an outcome analyzer to determine whether a first simulated outcome of executing the first hardware-specific action phase sequence satisfies an acceptability criterion; and
a cost function calculator to, when the first simulated outcome does not satisfy the acceptability criterion, calculate a first cost function output based on a difference between the first simulated outcome and the solution state of the scene, the first cost function output utilized by the action phase generator to generate updated action phase probabilities.

2. The apparatus of claim 1, wherein the action phases include a plurality of action phase parameters, the action phase generator to update the action phase parameters based on the first cost function output when the first simulated outcome does not satisfy the acceptability criterion.

3. The apparatus of claim 2, wherein the action phase parameters include at least one of a three-dimensional position, a three-dimensional velocity, or a three-dimensional acceleration.

4. The apparatus of claim 1, wherein the action phase generator is to generate the updated action phase probabilities based on a gradient-based technique.

5. The apparatus of claim 1, further including a robot controller to, when the first simulated outcome satisfies the acceptability criterion, cause the robot to execute the first hardware-specific action phase sequence.

6. The apparatus of claim 1, further including a solution state manager to access an initial training state and a final training state, the action phase generator to generate a second hardware independent action phase sequence to convert the initial training state to the final training state, the action phase generator to generate the updated action phase probabilities based on a second cost function output when a second simulated outcome of executing a second hardware-specific action phase sequence does not satisfy the acceptability criterion.

7. A non-transitory computer readable medium comprising computer readable instructions that, when executed, cause a processor to:
  determine an initial state of a scene;
  generate a first hardware independent action phase sequence to transform the initial state of the scene to a solution state of the scene by selecting a plurality of action phases for the hardware independent first action phase sequence based on action phase probabilities;
  convert the first hardware independent action phase sequence to a first hardware-specific action phase sequence based on one or more specifications of a robot that is to execute the first hardware independent action phase sequence;
  determine whether a first simulated outcome of executing the first hardware-specific action phase sequence satisfies an acceptability criterion; and
  when the first simulated outcome does not satisfy the acceptability criterion, calculate a first cost function output based on a difference between the first simulated outcome and the solution state of the scene, the first cost function output utilized to generate updated action phase probabilities.

8. The non-transitory computer readable medium of claim 7, wherein the action phases include a plurality of action phase parameters, the instructions, when executed, to update the action phase parameters based on the first cost function output when the first simulated outcome does not satisfy the acceptability criterion.

9. The non-transitory computer readable medium of claim 8, wherein the action phase parameters include at least one of a three-dimensional position, a three-dimensional velocity, or a three-dimensional acceleration.

10. The non-transitory computer readable medium of claim 7, wherein the instructions, when executed, cause the processor to generate the updated action phase probabilities based on a gradient-based technique.

11. The non-transitory computer readable medium of claim 7, wherein the instructions, when executed cause the robot to execute the first hardware-specific action phase sequence when the first simulated outcome satisfies the acceptability criterion.

12. The non-transitory computer readable medium of claim 7, wherein the instructions, when executed, cause the processor to:
  access an initial training state and a final training state;
  generate a second hardware independent action phase sequence to convert the initial training state to the final training state; and
  generate the updated action phase probabilities based on a second cost function output when a second simulated outcome of executing a second hardware-specific action phase sequence does not satisfy the acceptability criterion.

13. The non-transitory computer readable medium of claim 7, wherein a first probability of the action phase probabilities is stored in a conditional probability table, the first probability corresponding to a second type of action phase following a first type of action phase.

14. A method comprising:
  determining an initial state of a scene;
  generating a first hardware independent action phase sequence to transform the initial state of the scene to a solution state of the scene by selecting a plurality of action phases for the first hardware independent action phase sequence based on action phase probabilities;
  converting the first hardware independent action phase sequence to a first hardware-specific action phase sequence based on one or more specifications of a robot that is to execute the first hardware independent action phase sequence;
  determining whether a first simulated outcome of executing the first hardware-specific action phase sequence satisfies an acceptability criterion; and
  when the first simulated outcome does not satisfy the acceptability criterion, calculating a first cost function output based on a difference between the first simulated outcome and the solution state of the scene, the first cost function output utilized to generate updated action phase probabilities.

15. The method of claim 14, wherein the action phases include a plurality of action phase parameters, the method further including updating the action phase parameters based on the first cost function output when the first simulated outcome does not satisfy the acceptability criterion.

16. The method of claim 15, wherein the action phase parameters include at least one of a three-dimensional position, a three-dimensional velocity, or a three-dimensional acceleration.

17. The method of claim 14, further including generating the updated action phase probabilities based on a gradient-based technique.

18. The method of claim 14, further including causing the robot to execute the first hardware-specific action phase sequence when the first simulated outcome satisfies the acceptability criterion.

19. The method of claim 14, further including:
accessing an initial training state and a final training state;
generating a second hardware independent action phase sequence to convert the initial training state to the final training state; and
generating the updated action phase probabilities based on a second cost function output when a second simulated outcome of executing a second hardware-specific action phase sequence does not satisfy the acceptability criterion.

20. The method of claim 14, wherein a first probability of the action phase probabilities is stored in a conditional probability table, the first probability corresponding to a second type of action phase following a first type of action phase.

21. An apparatus comprising:
scene description generating circuitry to determine an initial state of a scene; action phase generating circuitry to:
generate a first hardware independent action phase sequence to transform the initial state of the scene to a solution state of the scene;
select a plurality of action phases for the first hardware independent action phase sequence based on action phase probabilities; and
convert the first hardware independent action phase sequence to a first hardware-specific action phase sequence based on one or more specifications of a robot that is to execute the first hardware independent action phase sequence;
outcome analyzing circuitry to determine whether a first simulated outcome of executing the first hardware-specific action phase sequence satisfies an acceptability criterion; and cost function calculating circuitry to, when the first simulated outcome does not satisfy the acceptability criterion, calculate a first cost function output based on a difference between the first simulated outcome and the solution state of the scene, the first cost function output utilized by the action phase generating circuitry to generate updated action phase probabilities.

22. The apparatus of claim 21, wherein the action phases include a plurality of action phase parameters, the action phase generating circuitry to update the action phase parameters based on the first cost function output when the first simulated outcome does not satisfy the acceptability criterion.

23. The apparatus of claim 22, wherein the action phase parameters include at least one of a three-dimensional position, a three-dimensional velocity, or a three-dimensional acceleration.

24. The apparatus of claim 21, wherein the action phase generating circuitry is to generate the updated action phase probabilities based on a gradient-based technique.

25. The apparatus of claim 21, further including robot controlling circuitry to, when the first simulated outcome satisfies the acceptability criterion, cause the robot to execute the first hardware-specific action phase sequence.

26. The apparatus of claim 21, further including solution state managing circuitry to access an initial training state and a final training state, the action phase generating circuitry to generate a second hardware independent action phase sequence to convert the initial training state to the final training state, the action phase generating circuitry to generate the updated action phase probabilities based on a second cost function output when a second simulated outcome of executing a second hardware-specific action phase sequence does not satisfy the acceptability criterion.

* * * * *